United States Patent
Han et al.

(10) Patent No.: US 6,345,435 B1
(45) Date of Patent: Feb. 12, 2002

(54) METHOD TO MAKE LAMINATED YOKE FOR HIGH DATA RATE GIANT MAGNETO-RESISTIVE HEAD

(75) Inventors: Cherng-Chyi Han, San Jose; Chyu-Jiuh Torng, Pleasanton; Rodney Lee, San Jose; Kochan Ju, Fremont, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/443,448

(22) Filed: Nov. 22, 1999

(51) Int. Cl.7 .................................................. G11B 5/42
(52) U.S. Cl. ................. 29/603.14; 29/603.15; 427/131
(58) Field of Search ..................... 29/603.14, 603.15; 427/128, 131, 132

(56) References Cited

U.S. PATENT DOCUMENTS

| | | | |
|---|---|---|---|
| 5,283,942 A | 2/1994 | Chen et al. | 29/603 |
| 5,805,392 A | 9/1998 | Mallary et al. | 360/113 |
| 5,843,521 A | 12/1998 | Ju et al. | 427/129 |
| 5,856,898 A | 1/1999 | Ohashi | 360/123 |

*Primary Examiner*—Carl E. Hall
(74) *Attorney, Agent, or Firm*—George O. Saile; Stephen B. Ackerman; Larry J. Prescott

(57) ABSTRACT

A method and design for the fabrication of a laminated yoke for a high data rate magnetic read-write transducer head. A full film layer of first ferromagnetic material is formed on a base using either plating or sputtering. The base comprises a read head, a ferromagnetic pole piece, and a ferromagnetic shield which also serves as a pole piece. A patterned layer of first non-magnetic dielectric is then formed on the full film layer of first ferromagnetic material. A patterned layer of photoresist is then formed on the full film layer of first ferromagnetic material and the patterned non-magnetic dielectric and used as a frame for a frame plating deposition of a patterned layer of second ferromagnetic material. The full film layer of first ferromagnetic material and the non-magnetic dielectric are then patterned, using the patterned layer of second ferromagnetic material as a mask and ion beam etching.

20 Claims, 4 Drawing Sheets

METHOD TO MAKE LAMINATED YOKE FOR HIGH DATA RATE GIANT MAGNETO-RESISTIVE HEAD

BACKGROUND OF THE INVENTION (1) Filed of the Invention

This invention relates to methods of forming a laminated yoke for the write head portion of a high data-rate giant magneto-resistive read-write transducer head.

(2) Description of the Related Art

Giant Magneto-Resistive read-write transducer heads having stitched pole magnetic write heads have data rates in the range of 500 Megabytes per second, however there is a strong need to increase the data rates of these transducer heads. Data rates of 700 Megabytes per second or even higher are desirable. To achieve these higher data rates it is necessary to use a laminated yoke design in the magnetic write head portion of the read-write transducer heads.

U.S. Pat. No. 5,283,942 to Chen et al. describes a method of fabricating a narrow thin film head. The method uses a sacrificial layer to provide control of the gap planarization procedure.

U.S. Pat. No. 5,856,898 to Ohashi describes spiral wiring patterns to provide current coils in a magnetic write head.

U.S. Pat. No. 5,805,392 to Mallary et al. describes methods of forming laminated pole pieces for magnetic write heads. Thin film layers of a magnetic material are used to form a pole piece of a thin film head.

U.S. Pat. No. 5,843,521 to Ju et al. describes a method for forming a magnetic transducer head using a photoresist frame plated pole layer. The method is used to achieve a desired shape of the frame plated pole layer.

SUMMARY OF THE INVENTION

To achieve high data rates, in the range of 700 Megabytes per second or higher, it is very desirable if not necessary to use a laminated yoke design in the magnetic write head portion of read-write transducer heads. In addition to laminating the yoke it is necessary to properly shape the yoke and pole tip regions of the magnetic write head. With a conventional pole and yoke laminated structure dry etching is the preferred solution to define the pattern of the pole and yoke. The poles fabricated by this technique, however, are limited by the ability of the dry etching technique to produce small dimension pole geometry.

It is a primary objective of this invention to provide a method of using a patterned dielectric process with a form plated pole and yoke process to form a pole and laminated yoke for a high data rate magnetic transducer head.

This objective is achieved by depositing a full film layer of first ferromagnetic material on a base. A patterned layer of first non-magnetic dielectric is then formed on the full film layer of first ferromagnetic material. The patterned layer of first non-magnetic dielectric is patterned using wet etching techniques or lift-off techniques. A layer of photoresist is then formed on the full film layer of first ferromagnetic material and the patterned layer of first non-magnetic dielectric. The layer of photoresist is then patterned to define the yoke dimensions and shape. The patterned layer of photoresist is then used as the frame for frame plating a patterned layer of second ferromagnetic material to form the upper yoke piece.

The patterned layer of second ferromagnetic material forming the upper yoke piece has a thickness of about four to ten times that of the thickness of the full film layer of first ferromagnetic material and is used as a hard mask to define the shape of the full film layer of first ferromagnetic material. The full film layer of first ferromagnetic material is then patterned using the patterned layer of second ferromagnetic material as a mask and ion beam etching, thereby completing the laminated yoke.

The base typically is a first ferromagnetic shield formed on a substrate. A layer of second non-magnetic dielectric is formed on the first ferromagnetic shield and a second ferromagnetic shield is formed on the layer of second non-magnetic dielectric. The second ferromagnetic shield also serves as a pole piece for the magnetic write head. A magnetic sensing element is located in the layer of second non-magnetic dielectric and between the first ferromagnetic shield and the second ferromagnetic shield. A layer of third non-magnetic dielectric is formed on the second ferromagnetic shield to form the magnetic gap between the pole pieces of the write head. A ferromagnetic pole piece, a ferromagnetic back gap piece, and one or more layers of wiring are then formed on the layer of third non-magnetic dielectric to complete the base.

DESCRIPTION OF THE PREFERRED EMBODIMENTS

A detailed description of the method of forming a laminated yoke for a magnetic read-write transducer of this invention will now be given with reference to FIGS. 1–5. The laminated yoke is formed on a base comprising a pole piece, a back gap piece, wiring layers, and a read head. A cross section of the base is shown in FIG. 1.

Figure 1:
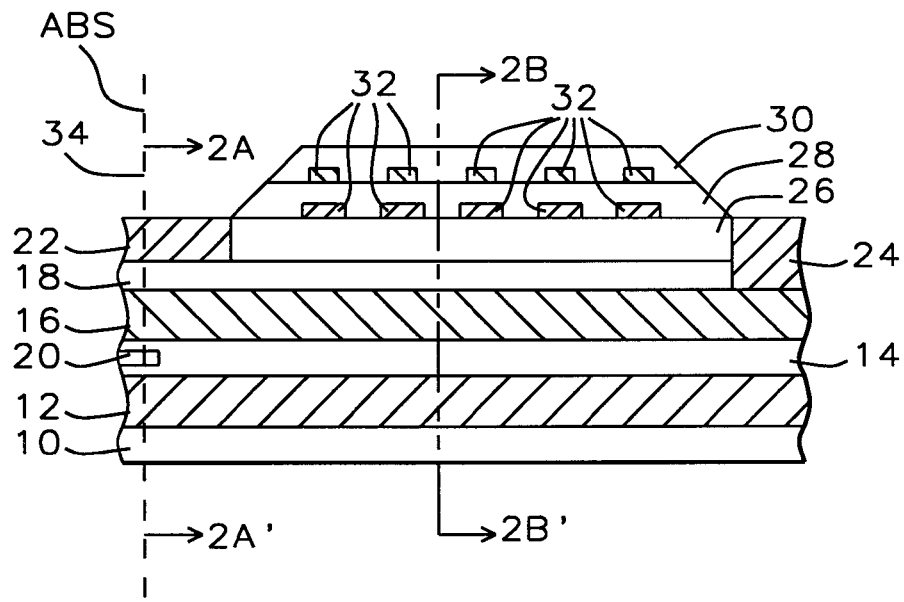
FIG. 1 shows a cross section view, in the direction of the edge of the ABS, of the base on which the laminated yoke is formed.

FIG. 1 shows a first ferromagnetic shield 12 formed on a substrate 10. A layer of second non-magnetic dielectric 14 is formed on the first ferromagnetic shield 12. A magnetic sensing element 20, such as a giant magnetoresistive sensing element, is formed in the layer of second non-magnetic dielectric 14. A second ferromagnetic shield 16 is formed on the layer of second non-magnetic dielectric 14 and a gap layer of third non-magnetic dielectric 18 is formed on the second ferromagnetic shield 16. The second ferromagnetic shield 16 also serves as a pole piece for the magnetic write head. A ferromagnetic pole piece 22, a ferromagnetic back gap piece 24, and a fourth non-magnetic dielectric 26 between the pole piece 22 and back gap piece 24 is then formed as shown in FIG. 1. One or more layers of wiring 32 imbedded in a fifth non-magnetic dielectric 28 and sixth non-magnetic dielectric 30, are formed as shown in FIG. 1 to complete the base. The base can have a planar top surface or a non planar top surface as shown in FIG. 1. The air bearing surface, ABS, is shown by a dashed line 34.

Figure 2A:
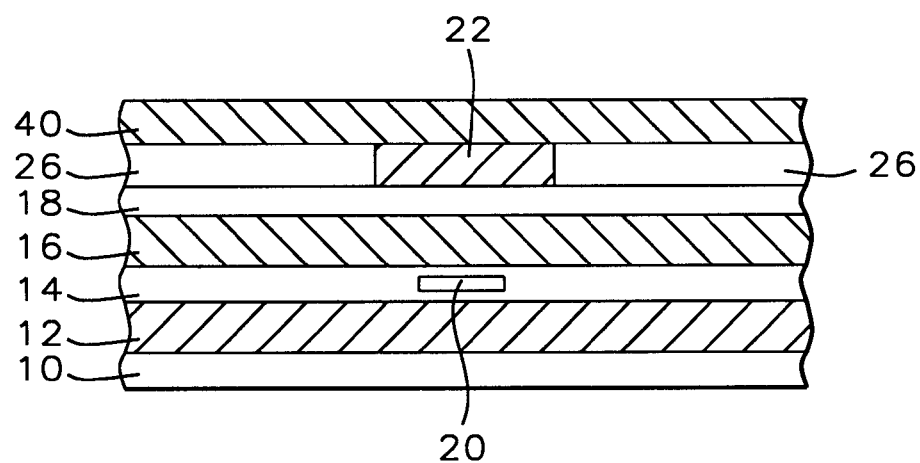
FIG. 2A shows a cross section view of the transducer, looking out of the ABS and along line 2A–2A' of FIG. 1, after the full film layer of first ferromagnetic material and the patterned layer of first non-magnetic dielectric have been formed.
Figure 2B:
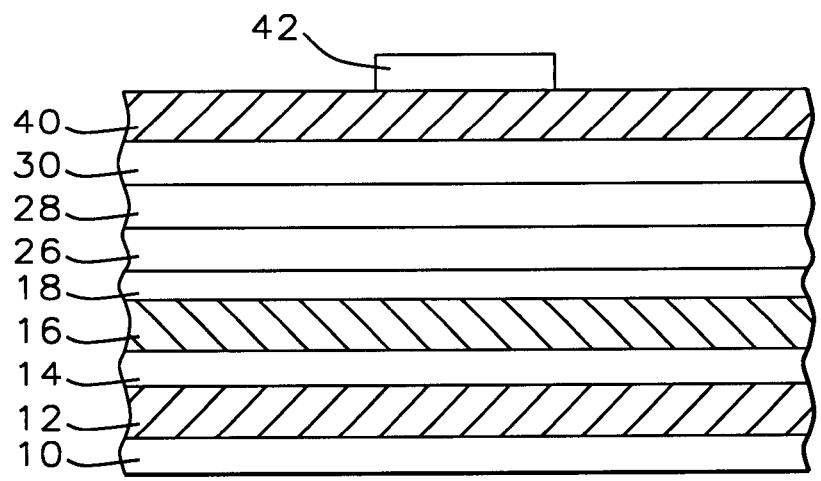
FIG. 2B shows a cross section view of the transducer, looking out of the ABS and along line 2B–2B' of FIG. 1, after the full film layer of first ferromagnetic material and the patterned layer of first non-magnetic dielectric have been formed.
Figure 3A:
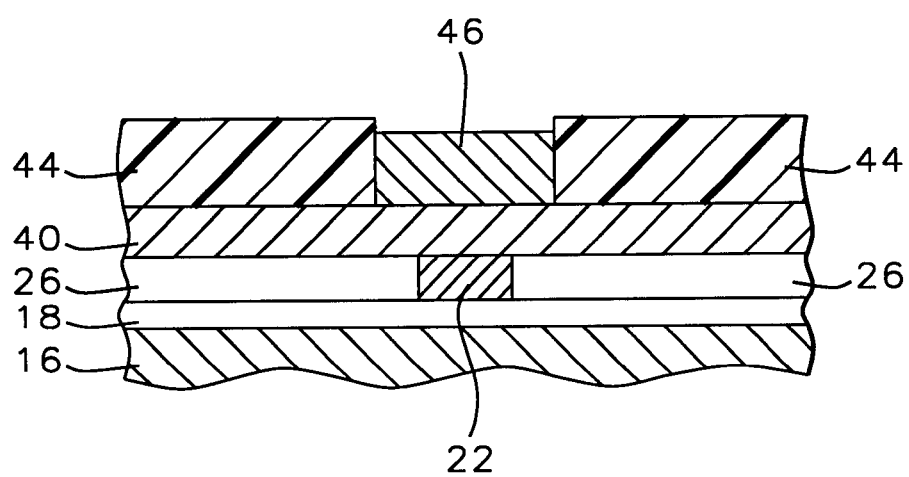
FIG. 3A shows a cross section view of the transducer, looking out of the ABS, after the patterned layer of photoresist and patterned layer of second ferromagnetic material have been formed.
Figure 3B:
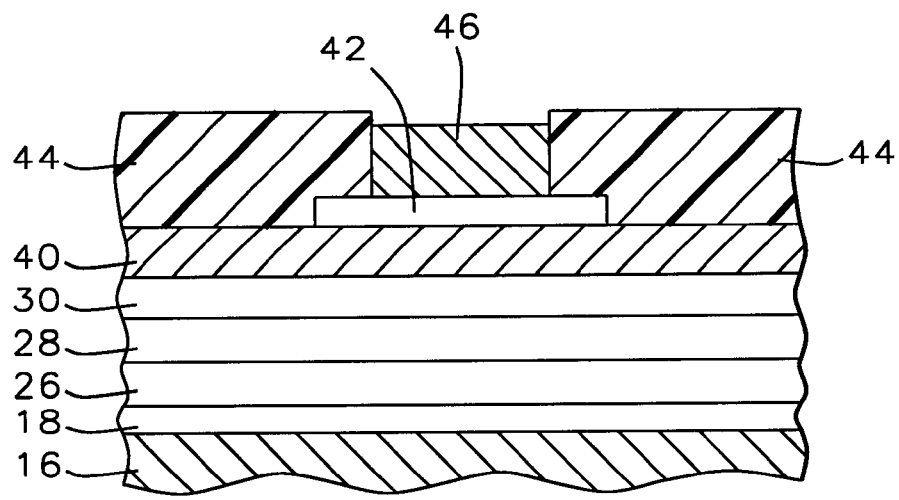
FIG. 3B shows a cross section view of the transducer, looking out of the ABS, after the patterned layer of photoresist and patterned layer of second ferromagnetic material have been formed.
Figure 4A:
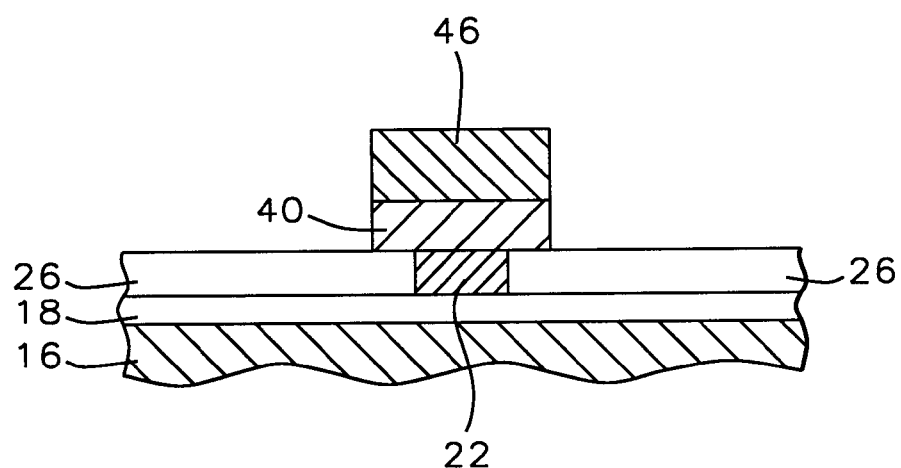
FIG. 4A shows a cross section view of the transducer, looking out of the ABS and along line 4A–4A' of FIG. 5, after the patterned layer of photoresist has been removed and the layer of first ferromagnetic material has been patterned.
Figure 4B:
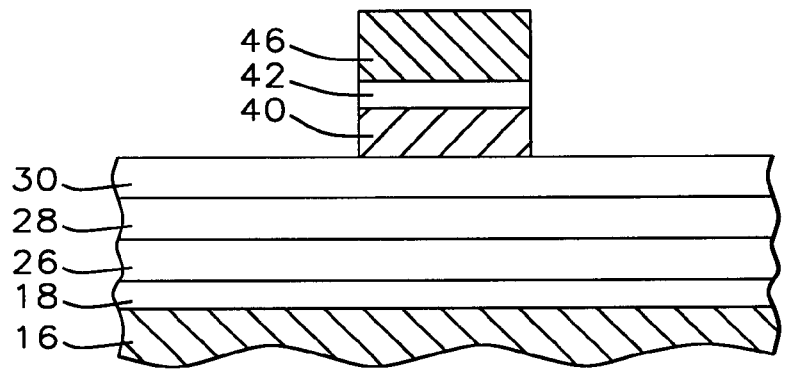
FIG. 4B shows a cross section view of the transducer, looking out of the ABS and along line 4B–4B' of FIG. 5, after the patterned layer of photoresist has been removed and the layer of first ferromagnetic material has been patterned.
Figure 5:
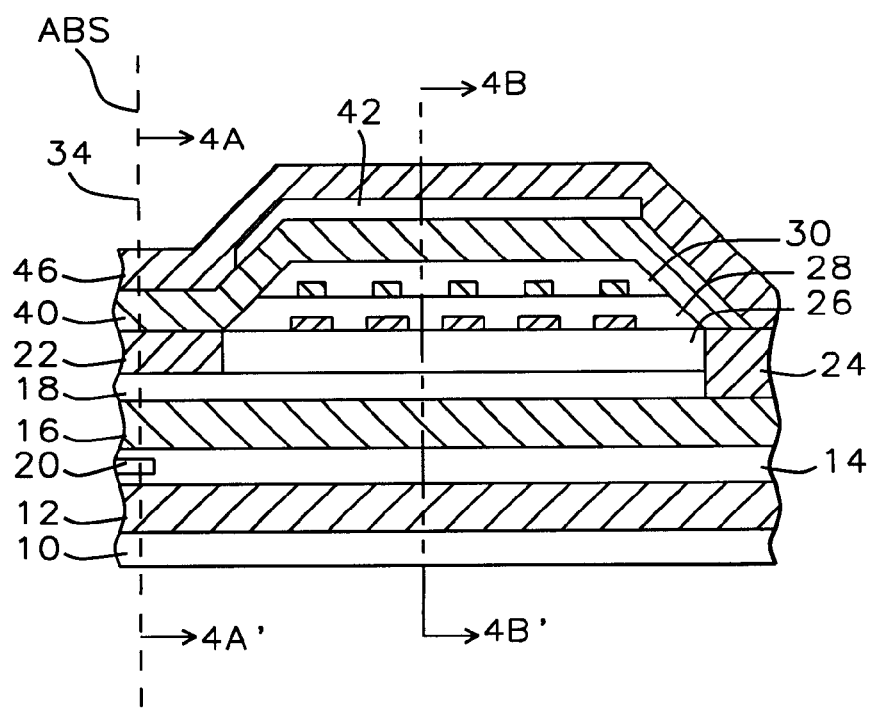
FIG. 5 shows a cross section view, in the direction of the edge of the ABS, of the completed magnetic read-write transducer.

FIGS. 1 and 5 show cross section views of the magnetic read-write transducer perpendicular to and looking at the edge of the ABS 34. FIGS. 2A–4B show cross section views of the magnetic read-write transducer perpendicular to the ABS, looking out of the ABS, and perpendicular to the cross section views of FIGS. 1 and 5. FIGS. 2A, 3A, and 4A are taken along the same plane. FIGS. 2B, 3B, and 4B are taken along the same plane. The same elements of the read-write transducer are indicated by the same reference numbers in FIGS. 1–5.

As shown in FIGS. 2A, 2B, and 5 a full film layer of first ferromagnetic material 40, having a thickness of between about 0.5 and 1.0 microns, is formed over the base making contact with the ferromagnetic pole piece 22 and the ferromagnetic back gap piece 24. In a first embodiment the full film layer of first ferromagnetic material 40 is formed by means of plating ferromagnetic materials such as $Ni_{45}Fe_{55}$ (45% Ni and 55% Fe) or CoNiFe. In a second embodiment the full film layer of first ferromagnetic material is formed by means of sputtering ferromagnetic materials such as FeAlN or FeTaN. The ferromagnetic materials used in either the plating deposition or the sputtering deposition have a high magnetic moment.

As shown in FIGS. 2B and 5 a patterned layer of first non-magnetic dielectric 42 is then formed on the full film layer of first ferromagnetic material 40. As shown in FIG. 5, the patterned layer of first non-magnetic dielectric 42 does not cover that part of the layer of first ferromagnetic material 40 over the ferromagnetic pole piece 22 or the ferromagnetic back gap piece 24. The first non-magnetic dielectric 42 is patterned using either wet etching techniques or lift-off process techniques with standard photolithographic methods. In this example the patterned layer of first non-magnetic dielectric 42 has a thickness of between about 20 and 200 Angstroms.

Next, as shown in FIGS. 3A, 3B, and 5 patterned layer of photoresist 44 is formed on the patterned layer of first non-magnetic dielectric 42 and the full film layer of first ferromagnetic material 40. The pattern in the patterned layer of photoresist 44 defines the shape and dimensions of the laminated yoke. The patterned layer of photoresist 44 serves as the frame for a frame plating deposition of a patterned layer of second ferromagnetic material 46, having a thickness of between about 3.0 and 6.0 microns. The second ferromagnetic material is a high magnetic moment material such as $Ni_{45}Fe_{55}$ or CoNiFe.

Next, as shown in FIGS. 4A, 4B, and 5, the layer of photoresist is stripped and the patterned layer of second ferromagnetic material 46 is used as a hard mask and that part of the full film layer of first ferromagnetic material 40 and the first non-magnetic dielectric 42 not covered by the patterned layer of second ferromagnetic material 46 is etched away using an ion beam etch. Since the thickness of the patterned layer of second ferromagnetic material 46 is four to ten times the thickness of the first ferromagnetic material 40 and at least 150 times the thickness of the first non-magnetic dielectric 42, the patterned layer of second ferromagnetic material 46 can act as a mask for this ion beam etch process. The ion beam etch defines the dimension and shape of the laminated yoke. FIG. 5 shows a cross section view of the completed laminated yoke.

While the invention has been particularly shown and described with reference to the preferred embodiments thereof, it will be understood by those skilled in the art that various changes in form and details may be made without departing from the spirit and scope of the invention.

What is claimed is:

1. A method of forming a laminated yoke, comprising:
   providing a base, wherein said base comprises a ferromagnetic pole piece and a ferromagnetic back gap piece;
   plating a full film layer of a first ferromagnetic material on said base, wherein said layer of said first ferromagnetic material contacts said pole piece and said back gap piece;
   forming a patterned layer of a first non-magnetic dielectric on said layer of first ferromagnetic material wherein said patterned layer of first non-magnetic dielectric does not cover that part of said layer of said first ferromagnetic material over said ferromagnetic pole piece and over said ferromagnetic back gap piece;
   forming a patterned layer of photoresist over said layer of first ferromagnetic material and said patterned layer of first non-magnetic dielectric;
   forming a patterned layer of a second ferromagnetic material over said layer of first ferromagnetic material and said patterned layer of first non-magnetic dielectric using frame plating, and said patterned layer of photoresist as a frame for said frame plating, wherein said patterned layer of second ferromagnetic material contacts that part of said layer of first ferromagnetic material over said ferromagnetic pole piece and over said ferromagnetic back gap piece;
   removing said patterned layer of photoresist; and
   patterning said layer of first ferromagnetic material using ion beam etching and said patterned layer of second ferromagnetic material as a mask.

2. The method of claim 1 wherein said base further comprises:
   a first ferromagnetic shield;
   a layer of second non-magnetic dielectric formed on said first ferromagnetic shield;
   a second ferromagnetic shield formed on said layer of second non-magnetic dielectric, wherein said second ferromagnetic shield also serves as a pole piece for a magnetic write head;
   a magnetic sensing element located in said layer of second non-magnetic dielectric and between said first ferromagnetic shield and said second ferromagnetic shield; and
   a layer of third non-magnetic dielectric formed on said second ferromagnetic shield.

3. The method of claim 1 wherein said layer of first ferromagnetic material is a layer of $Ni_{45}Fe_{55}$ having a thickness of between about 0.5 and 1.0 microns.

4. The method of claim 1 wherein said layer of first ferromagnetic material is a layer of CoNiFe having a thickness of between about 0.5 and 1.0 microns.

5. The method of claim 1 wherein said patterned layer of first non-magnetic dielectric is aluminum oxide having a thickness of between about 20 and 200 Angstroms.

6. The method of claim 1 wherein said patterned layer of first non-magnetic dielectric is silicon dioxide having a thickness of between about 20 and 200 Angstroms.

7. The method of claim 1 wherein said patterned layer of first non-magnetic dielectric is silicon nitride having a thickness of between about 20 and 200 Angstroms.

8. The method of claim 1 wherein said patterned layer of first non-magnetic dielectric is patterned using wet etch techniques or a lift-off process.

9. The method of claim 1 wherein said patterned layer of second ferromagnetic material is a layer of $Ni_{45}Fe_{55}$ having a thickness of between about 3.0 and 6.0 microns.

10. The method of claim 1 wherein said patterned layer of second ferromagnetic material is a layer of CoNiFe having a thickness of between about 3.0 and 6.0 microns.

11. A method of forming a laminated yoke, comprising:

providing a base, wherein said base comprises a ferromagnetic pole piece and a ferromagnetic back gap piece;

sputtering a full film layer of a first ferromagnetic material on said base, wherein said layer of first ferromagnetic material contacts said ferromagnetic pole piece and said ferromagnetic back gap piece;

forming a patterned layer of first non-magnetic dielectric on said layer of first ferromagnetic material wherein said patterned layer of first non-magnetic dielectric does not cover that part of said layer of first ferromagnetic material over said ferromagnetic pole piece and over said ferromagnetic back gap piece;

forming a patterned layer of photoresist over said layer of first ferromagnetic material and said patterned layer of first non-magnetic dielectric;

forming a patterned layer of a second ferromagnetic material over said layer of first ferromagnetic material and said patterned layer of first non-magnetic dielectric using frame plating, and said patterned layer of photoresist as a frame for said frame plating, wherein said patterned layer of second ferromagnetic material contacts that part of said layer of first ferromagnetic material over said ferromagnetic pole piece and over said ferromagnetic back gap piece;

removing said patterned layer of photoresist; and patterning said layer of first ferromagnetic material using ion beam etching and said patterned layer of second ferromagnetic material as a mask.

12. The method of claim 11 wherein said base further comprises:

a first ferromagnetic shield;

a layer of second non-magnetic dielectric formed on said first ferromagnetic shield;

a second ferromagnetic shield formed on said layer of second non-magnetic dielectric, wherein said second ferromagnetic shield also serves as a pole piece for a magnetic write head;

a magnetic sensing element located in said layer of second non-magnetic dielectric and between said first ferromagnetic shield and said second ferromagnetic shield; and a layer of third non-magnetic dielectric formed on said second ferromagnetic shield.

13. The method of claim 11 wherein said layer of first ferromagnetic material is a layer of FeAlN having a thickness of between about 0.5 and 1.0 microns.

14. The method of claim 11 wherein said layer of first ferromagnetic material is a layer of FeTaN having a thickness of between about 0.5 and 1.0 microns.

15. The method of claim 11 wherein said patterned layer of first non-magnetic dielectric is aluminum oxide having a thickness of between about 20 and 200 Angstroms.

16. The method of claim 11 wherein said patterned layer of first non-magnetic dielectric is silicon dioxide having a thickness of between about 20 and 200 Angstroms.

17. The method of claim 11 wherein said patterned layer of first non-magnetic dielectric is silicon nitride having a thickness of between about 20 and 200 Angstroms.

18. The method of claim 11 wherein said patterned layer of first non-magnetic dielectric is patterned using wet etching techniques or a lift-off process.

19. The method of claim 11 wherein said patterned layer of second ferromagnetic material is a layer of $Ni_{45}Fe_{55}$ having a thickness of between about 3.0 and 6.0 microns.

20. The method of claim 11 wherein said patterned layer of second ferromagnetic material is a layer of CoNiFe having a thickness of between about 3.0 and 6.0 microns.

* * * * *